(12) United States Patent
Flick

(10) Patent No.: US 6,801,119 B1
(45) Date of Patent: *Oct. 5, 2004

(54) PROGRAMMER FOR VEHICLE SECURITY SYSTEMS AND RELATED METHODS

(75) Inventor: Kenneth E. Flick, Douglasville, GA (US)

(73) Assignee: Omega Patents, L.L.C., Douglasville, GA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 744 days.

(21) Appl. No.: 09/034,963

(22) Filed: Mar. 4, 1998

(51) Int. Cl.[7] .............................................. G05B 23/00
(52) U.S. Cl. ........................ 340/5.72; 340/7; 340/426
(58) Field of Search ............................... 340/426, 5.72, 340/5.2, 5.7

(56) References Cited

U.S. PATENT DOCUMENTS

| | | | |
|---|---|---|---|
| 4,794,368 A | * 12/1988 | Grossheim et al. | ............ 340/63 |
| 4,881,148 A | 11/1989 | Lambropoulos et al. | |
| 4,928,098 A | 5/1990 | Dannhaeuser | |
| 4,935,735 A | * 6/1990 | DeLuca et al. | ........ 340/825.44 |
| 4,975,969 A | 12/1990 | Tal | |
| 5,049,867 A | 9/1991 | Stouffer | |
| 5,055,701 A | 10/1991 | Takeuchi | |
| 5,099,226 A | 3/1992 | Andrews | |
| 5,103,221 A | 4/1992 | Memmola | |
| 5,113,182 A | * 5/1992 | Suman et al. | .......... 340/825.31 |
| 5,146,215 A | 9/1992 | Drori | |
| 5,243,322 A | 9/1993 | Thompson et al. | |
| 5,252,966 A | 10/1993 | Lambropoulos et al. | |
| 5,278,547 A | 1/1994 | Suman et al. | |
| 5,365,225 A | 11/1994 | Bachhuber | |
| 5,406,274 A | 4/1995 | Lambropoulos et al. | |
| 5,412,379 A | 5/1995 | Waraksa et al. | |
| 5,442,341 A | 8/1995 | Lambropoulos | |
| 5,469,506 A | 11/1995 | Berson et al. | |
| 5,513,105 A | 4/1996 | Krones | |
| 5,563,579 A | 10/1996 | Carter | |
| 5,654,688 A | 8/1997 | Allen et al. | |
| 5,864,297 A | * 1/1999 | Sollestre et al. | ........ 340/825.31 |

FOREIGN PATENT DOCUMENTS

| | | | | |
|---|---|---|---|---|
| DE | 43 25 221 A1 | 7/1993 | ........... | B60R/25/00 |
| EP | 0 535 555 A1 | 9/1992 | ........... | E05B/49/00 |
| WO | 91/15645 | 10/1991 | ........... | E05B/49/00 |

* cited by examiner

Primary Examiner—Michael Horabik
Assistant Examiner—M Shimizu
(74) Attorney, Agent, or Firm—Allen, Dyer, Doppelt, Milbrath & Gilchrist, P.A.

(57) ABSTRACT

A vehicle security system programmer includes a housing and a plurality of manually settable switches carried by the housing. The vehicle security system is switchable to a programming mode responsive to a programming mode signal, and when in the programming mode sets a plurality of programmable features responsive to feature programming signals. The programmer also includes a programming mode circuit for communicating to the programmable vehicle security system a programming mode signal. Accordingly, the programmer can set the vehicle security system to the programming mode. In addition, the programmer also includes a feature programmer circuit for communicating to the programmable vehicle security system a plurality of feature programming signals based upon the plurality of manually settable switches. The programmer may be set for a number vehicle security systems, and sequentially connected to the vehicle security systems' for programming. The programmable vehicle security system may include a plurality of input conductors. Accordingly, the programming mode circuit and/or the feature programmer circuit may impress signals on at least one of the input conductors. The programmer may also communicate over a data bus with the vehicle security system controller.

7 Claims, 4 Drawing Sheets

PROGRAMMER FOR VEHICLE SECURITY SYSTEMS AND RELATED METHODS

FIELD OF THE INVENTION

The present invention relates to vehicle security, and, more particularly, to a programmer for programmable vehicle security systems.

BACKGROUND OF THE INVENTION

Vehicle security systems are widely used to deter vehicle theft, prevent theft of valuables from a vehicle, deter vandalism, and to protect vehicle owners and occupants. A typical automobile security system, for example, includes a central processor or controller connected to a plurality of vehicle sensors. The sensors, for example, may detect opening of the trunk, hood, doors, windows, and also movement of the vehicle or within the vehicle. Ultrasonic and microwave motion detectors, vibration sensors, sound discriminators, differential pressure sensors, and switches may be used as sensors. In addition, radar sensors may be used to monitor the area proximate the vehicle.

The controller typically operates to give an alarm indication in the event of triggering of a vehicle sensor. The alarm indication may typically be a flashing of the lights and/or the sounding of the vehicle horn or a siren. In addition, the vehicle fuel supply and/or ignition power may be selectively disabled based upon an alarm condition.

There are also other features of many conventional vehicle security systems, such as the ability to place the system in a valet mode so that others may use the vehicle without triggering the alarm. In addition, many of the various features available may be selected to be different than system defaults. For example, U.S. Pat. No. 5,654,688 to the assignee of the present application discloses a programmable vehicle security system wherein an installer or user may make feature selections upon entering a programming mode.

As disclosed, entry into the program mode is achieved by: turning the ignition switch to the on position, pressing the valet switch for four seconds and releasing the switch. The valet switch is then pressed and held for another four seconds and a designated switch on a remote transmitter is pressed. The system will confirm entry into the program mode by chirping the alarm siren. While in this mode, the valet switch is kept depressed and the button on the remote transmitter is pressed to enter the installer program mode. Momentarily pressing the valet switch and releasing it will increment the program mode to the next feature. The net result is that the valet switch is used to scroll down the customer or installer set-up or feature selection menu. Another button on the remote transmitter may be used to select between the factory default settings and the desired programmable setting.

Of course, there are many variations of routines to enter the program mode and select the various selectable features. One approach to simplify the labor intensive conventional step-by-step procedure for programming a vehicle security system is to use a personal computer 10, having appropriate software for communicating with the vehicle security system controller 12 via the cable 11 as shown in FIG. 1. The installer may then select, via a displayed computer menu, the various settings desired to be downloaded to the controller 12. Unfortunately, using a personal computer 10 for such an operation is relatively expensive. In addition, a conventional personal computer 10 may be subjected to damage. Even a notebook computer may not be sufficiently rugged for use in the typical installation setting.

SUMMARY OF THE INVENTION

In view of the foregoing background it is therefore an object of the present invention to provide a relatively inexpensive and rugged programmer and method for programming vehicle security systems.

These and other objects, features, and advantages in accordance with the present invention are provided by a vehicle security system programmer including a housing and a plurality of manually settable switches carried by the housing. The vehicle security system is switchable to a programming mode responsive to a programming mode signal, and when in the programming mode sets a plurality of programmable features responsive to feature programming signals. The programmer also includes programming mode means in the housing for communicating to the programmable vehicle security system the programming mode signal. Accordingly, the programmer can set the vehicle security system to the programming mode. In addition, the programmer also includes feature programmer means in the housing for communicating to the programmable vehicle security system a plurality of feature programming signals based upon the settings of the manually settable switches.

The programmer may be set for a number vehicle security systems, and sequentially connected to the vehicle security systems for programming. Moreover, the manual switches and associated circuitry of the programmer in accordance with the invention can be rugged, reliable, and considerably less expensive than current personal computer-based programming approaches.

The programmable vehicle security system may include a plurality of input conductors. Accordingly, the programming mode means and/or the feature programmer means may comprise means for impressing signals on at least one of the input conductors. The means for impressing signals may include means for connecting two of the input conductors together. In some embodiments, the input conductors may include at least one input power conductor, and the means for impressing signals may connect the at least one input power conductor to at least one other conductor.

In an embodiment of the invention, the programmable features are sequentially selectable in the programmable vehicle security system. Accordingly, the feature programmer means comprises sequential setting means cooperating with the programmable vehicle security system for sequentially selecting and setting the programmable features.

Another type of vehicle security system may have a data input bus for receiving one or both of the program mode signal and the feature programming signals. For this variation, the program mode means and/or feature programmer means comprises means for communicating the desired signals on the data input bus.

An interconnecting cable may be provided for temporarily interconnecting the vehicle security system programmer and the vehicle security system. In addition, the vehicle security system programmer may further comprise indicia on the housing adjacent respective switches to identify respective programmable features associated therewith. Accordingly, ease of use is enhanced.

A method aspect of the invention is for programming a programmable vehicle security system. The vehicle security system is switchable to a programming mode responsive to a programming mode signal and when in the programming mode its features may be set responsive to feature programming signals. The method preferably comprises the steps of providing a vehicle security system programmer comprising-a housing and a plurality of manually settable switches carried by the housing, and manually setting the plurality of manually settable switches to desired positions. The method may preferably further include the steps of communicating to the programmable vehicle security system a programming mode signal with the programmer, and communicating to the vehicle security system a plurality of feature programming signals with the programmer based upon the plurality of manually set switches.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
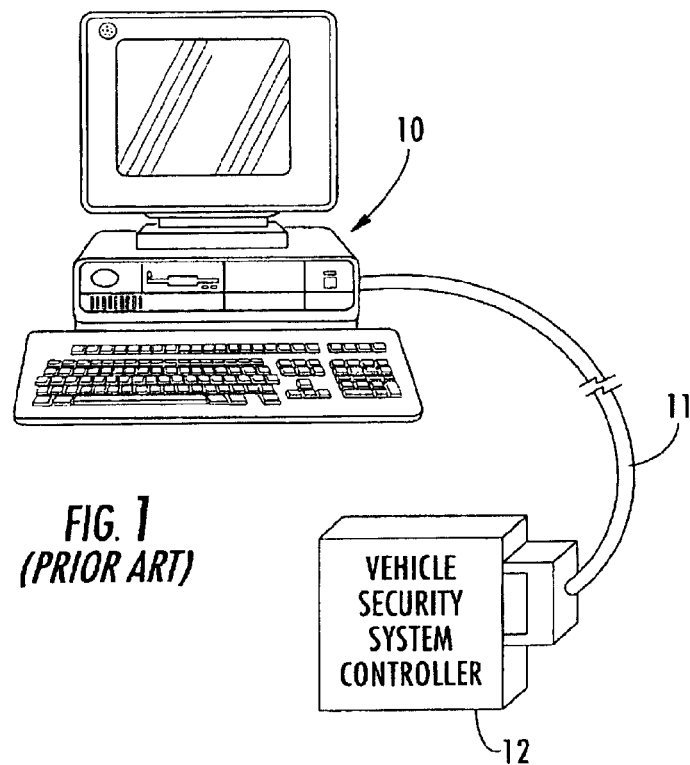
FIG. 1 is a perspective view a portable computer-based programmer for vehicle security systems as in the prior art.
Figure 2A:
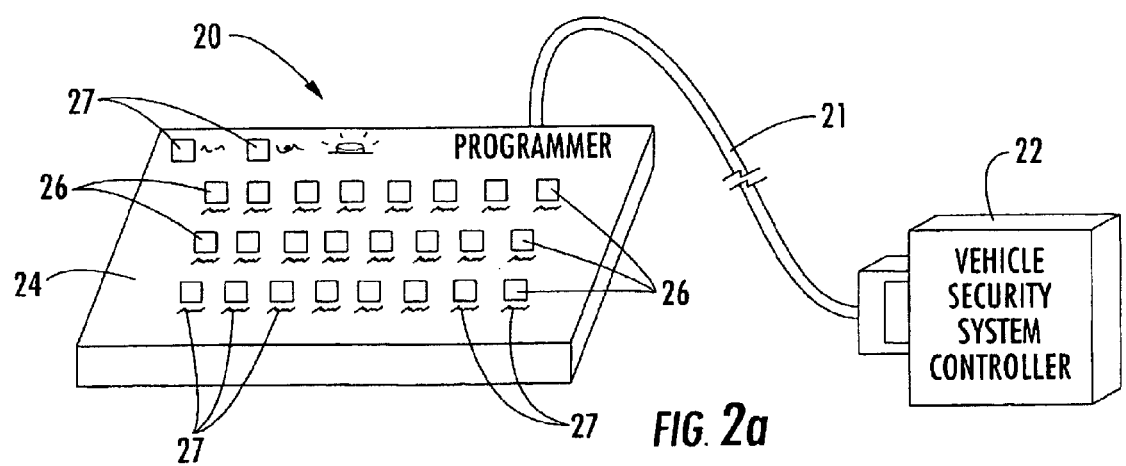
FIGS. 2a and 2b are perspective views of different embodiments of a programmer for vehicle security systems in accordance with the present invention.
Figure 2B:
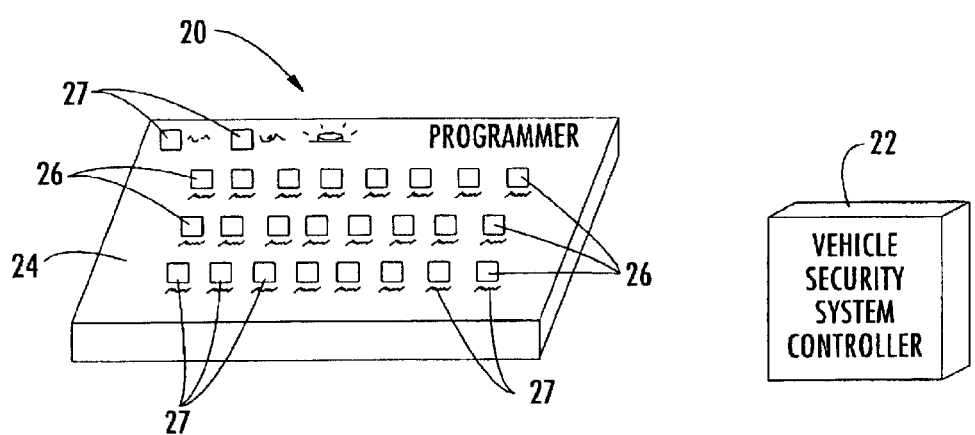
Figure 3:
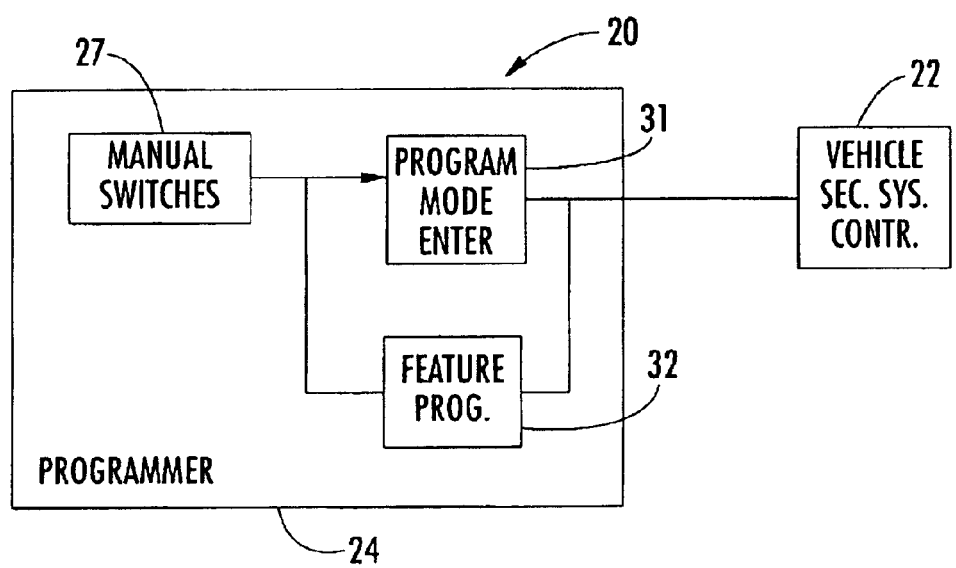
FIG. 3 is a block diagram of the programmer as shown in FIGS. 2a and 2b.
Figure 4:
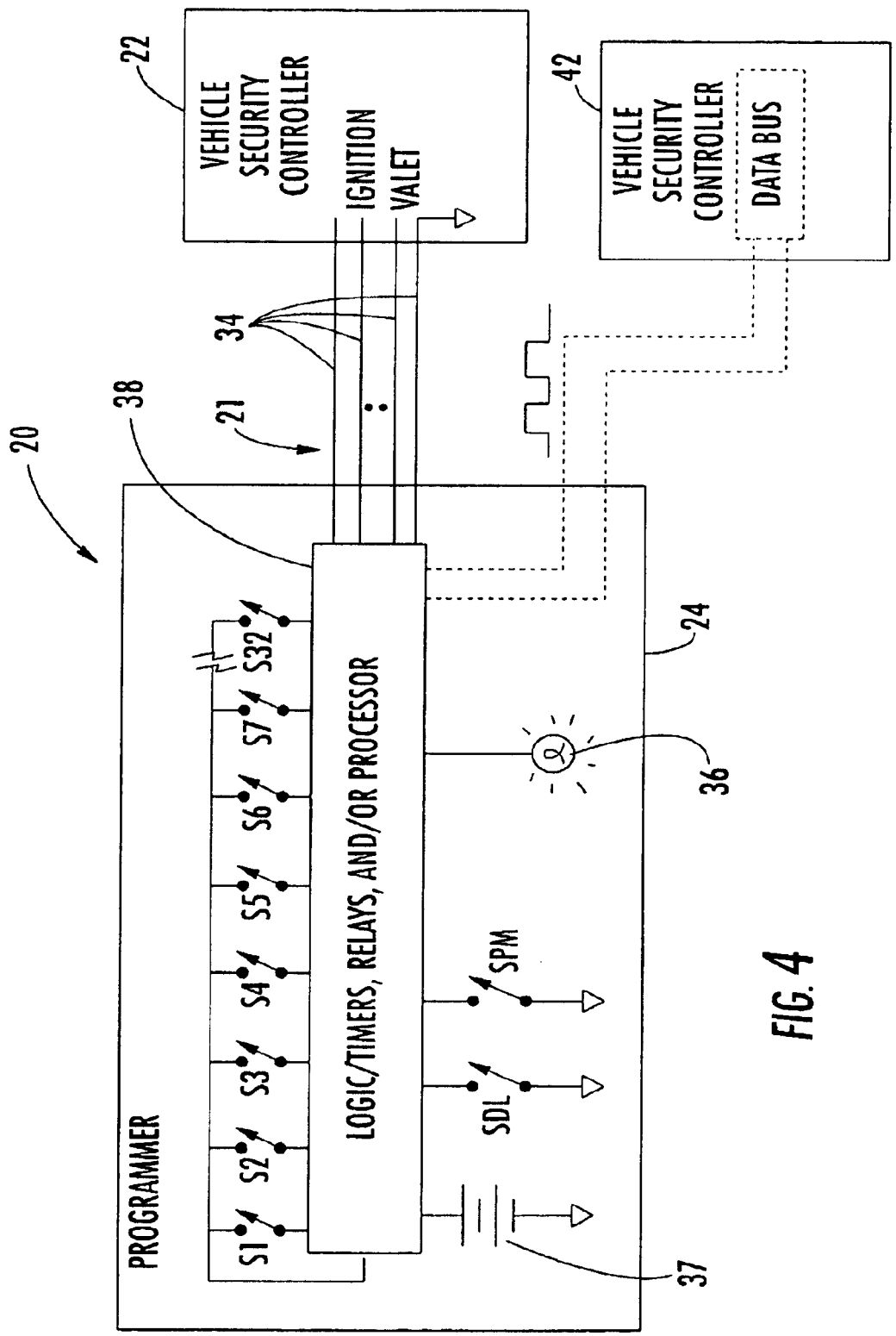
FIG. 4 is a more detailed diagram of the programmer as shown in FIG. 3.

Referring to FIGS. 2 through 4, the vehicle security system programmer 20 in accordance with the present invention is now described. Prime notation is used in alternate embodiments to indicate similar elements. The programmer 20 is illustratively connected to the security system controller 22 by the illustrated cable 21 in FIG. 2a, although those of skill in the art will recognize that in other embodiments wireless communication techniques may also be used, as illustrated in FIG. 2b. The programmer 20 includes a housing 24 and a plurality of manually settable switches 26 carried by the housing. The vehicle security system controller 22 is switchable to a programming mode responsive to a programming mode signal, and when in the programming mode a plurality of programmable features are set responsive to feature programming signals.

The programmer 20 also includes programming mode means 31 (FIGS. 2a, 2b) in the housing 24 for communicating to the controller 22 of vehicle security system a programming mode signal. Accordingly, the programmer 20 can set the vehicle security system to the programming mode. The programming mode means 31 may generate and download the programming mode signal.

In addition, the programmer 20 also includes feature programmer means 32 in the housing 24 for communicating to the programmable vehicle security system controller 22 a plurality of feature programming signals based upon the settings of the manually settable switches 27. In addition, the vehicle security system programmer 20 may further comprise indicia 27 on the housing adjacent respective switches to identify respective programmable features associated therewith (FIGS. 2a, 2b). Accordingly, ease of use is enhanced.

The programmer 20 may be set for a number vehicle security systems, and sequentially connected to the vehicle security systems for programming. As will be readily appreciated by those skilled in the art, the manual switches 27 and associated circuitry of the programmer 20 in accordance with the invention will be rugged, reliable, and considerably less expensive than current computer-based programming approaches.

The controller 22 of the vehicle security system may include a plurality of input pins or conductors 34 (FIG. 3) as will also be readily appreciated by those skilled in the art. The input conductors 34 are shown as part of the connecting cable 21 for clarity. The programming mode means 31 and/or the feature programmer means 32 may include circuitry for impressing signals on at least one of the input conductors 34. The means for impressing signals may include means for connecting two of the input conductors 34 together. In some embodiments, the input conductors 34 may include at least one input power conductor, such as ground or a plus battery voltage, for example, and the means for impressing signals may connect the at least one input power conductor to at least one other conductor. As understood with more particular reference to FIG. 4, the means for impressing signals may be provided by conventional logic circuitry, relays, and/or a processor circuit 38 as will be readily appreciated by those skilled in the art. The circuit 38 can provide the needed timing and signal levels.

Different manufacturers, and different product lines from a given manufacturer may have different sequences of the signals required to enter the programming mode, and to select the various features. For example, as discussed above with reference to U.S. Pat. No. 5,654,688, a particular vehicle sensor status, such as the ignition may need to be set, and the valet switch pressed in a desired. sequence. These signals can be impressed upon the respective input conductors 34 as shown in FIG. 4. Of course, other sequences and signals can also be readily implemented by the programmer 20.

As also shown in FIG. 4, the switches 27 of the programmer 20 may include features selection switches S1–S32, as well as a download switch Sd1 and a program mode switch Spm. The program mode switch Spm may cause the programmer 20 to switch the controller 22 to the program mode, and the download switch Sd1 can be pressed to download the feature selection signals. The feature select switches S1–S32 may be any type of manually settable switch, such as a toggle switch, rotary switch, slide switch, etc. The download switch Sd1 and the program mode switch Spm may be momentary switches as will also be readily appreciated by those skilled in the art. The programmer 20 may include a battery 37, and may also include one or more indicators 36, such as to indicate whether the controller 22 has entered the programming mode.

The programmer 20 of the present invention represents a considerable improvement of the labor intensive approach of manually scrolling through feature menus. Also, the programmer 20 with its manually set switches 27 represents a considerable improvement over complicated personal computer-based programming systems.

The programmable features may be sequentially selectable in the programmable vehicle security system. Accordingly, the feature programmer means 32 may comprise sequential setting means cooperating with the programmable vehicle security system controller 22 for sequentially selecting and setting the programmable features. The sequential setting means may also be provided by the logic circuitry, relays, and or processor circuit 38 as schematically illustrated in FIG. 4.

Another type of vehicle security system controller 42 as shown in the lower lefthand portion of FIG. 4 may have a data input link or bus 43 for receiving one or both of the program mode signal and the feature programming signals. Accordingly, the program mode means and/or feature programmer means comprises means for communicating the desired signals on the data input bus provided by the circuitry 38 as will be also appreciated by those skilled in the art.

A method aspect of the invention is for programming a programmable vehicle security system having a controller 22 as shown in FIGS. 2–4. The vehicle security system is switchable to a programming mode responsive to a programming mode signal and when in the programming mode its features may be set responsive to feature programming signals. The method preferably comprises the steps of providing a vehicle security system programmer 20 comprising a housing 24 and a plurality of manually settable switches 27 carried by the housing, and manually setting the plurality of manually settable switches to desired positions. The method may preferably further include the steps of communicating to the programmable vehicle security system a programming mode signal with the vehicle security system programmer, and communicating to the programmable vehicle security system a plurality of feature programming signals with the vehicle security system programmer based upon the plurality of manually set switches.

Although the description has been specific to vehicle security systems, such as providing an alarm, a remote keyless entry (RKE) system also controls access, and, thus, security of the vehicle. Many RKE systems also have selectable features and these are intended to be encompassed by the term vehicle security system as will be understood by those skilled in the art.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. A combination of a portable vehicle security system programmer and a programmable vehicle security system temporarily connected in wireless communication therewith, the vehicle security system being switchable to a programming mode responsive to a programming mode signal and when in the programming mode setting a plurality of programmable features responsive to feature programming signals, said portable vehicle security system programmer comprising:

a portable housing;

wireless programming mode means in said portable housing for wirelessly communicating to the programmable vehicle security system a programming mode signal;

a plurality of manually settable switches carried by said portable housing, each manually settable switch having a plurality of manually settable switch positions in which the switch will remain until a different switch position is manually set by a user;

indicia on said housing adjacent respective manually settable switches to identify respective programmable features associated therewith; and wireless feature programmer means in said portable housing for wirelessly communicating to the programmable vehicle security system a plurality of feature programming signals based upon the plurality of manually settable switches.

2. A combination according to claim 1 wherein the programmable features are sequentially selectable in the programmable vehicle security system; and wherein said wireless feature programmer means comprises sequential setting means cooperating with the programmable vehicle security system for sequentially selecting and setting the programmable features.

3. A combination according to claim 1 wherein the programmable vehicle security system includes a controller comprising a microprocessor operating under stored program control.

4. A portable vehicle security system programmer for a programmable vehicle security system temporarily connected in wireless communication therewith, the vehicle security system being switchable to a programming mode responsive to a programming mode signal and when in the programming mode setting a plurality of programmable features responsive to feature programming signals, said portable vehicle security system programmer comprising:

a portable housing;

wireless programming mode means in said portable housing for wirelessly communicating to the programmable vehicle security system a programming mode signal;

a plurality of manually settable switches carried by said portable housing, each manually settable switch having a plurality of manually settable switch positions in which the switch will remain until a different switch position is manually set by a user;

indicia on said portable housing adjacent respective manually settable switches to identify respective programmable features associated therewith; and wireless feature programmer means in said portable housing for wirelessly communicating to the programmable vehicle security system a plurality of feature programming signals based upon the plurality of manually settable switches.

5. A vehicle security system programmer according to claim 4, wherein the programmable features are sequentially selectable in the programmable vehicle security system; and wherein said wireless feature programmer means comprises sequential setting means cooperating with the programmable vehicle security system for sequentially selecting and setting the programmable features.

6. A wireless programming method for a programmable vehicle security system being switchable to a programming mode responsive to a programming mode signal and when in the programming mode setting a plurality of programmable features responsive to feature programming signals, the method comprising the steps of:

providing a portable vehicle security system programmer comprising a portable housing, a plurality of manually settable switches carried by the portable housing, and indicia on the portable housing adjacent respective manually settable switches to identify respective programmable features associated therewith, each manually settable switch having a plurality of manually settable switch positions in which the switch will remain until a different switch position is manually set by a user;

manually setting the plurality of manually settable switches to desired positions;

wirelessly communicating to the programmable vehicle security system a wireless programming mode signal with the portable vehicle security system programmer; and wirelessly communicating to the programmable vehicle security system a plurality of wireless feature programming signals with the portable vehicle security system programmer based upon the plurality of manually set switches.

7. A method according to claim 6 wherein the programmable features are sequentially selectable in the programmable vehicle security system; and wherein wirelessly communicating to the programmable security system the plurality of wireless feature programming signals comprises sequentially selecting and setting the programmable features.

\* \* \* \* \*